July 8, 1952          H. E. JURGENS          2,602,525

BRAKE MECHANISM FOR MOTOR-OPERATED VEHICLES

Filed July 2, 1949          2 SHEETS—SHEET 1

INVENTOR.
HERMAN E. JURGENS
BY
ATTORNEY.

July 8, 1952 H. E. JURGENS 2,602,525
BRAKE MECHANISM FOR MOTOR-OPERATED VEHICLES
Filed July 2, 1949 2 SHEETS—SHEET 2
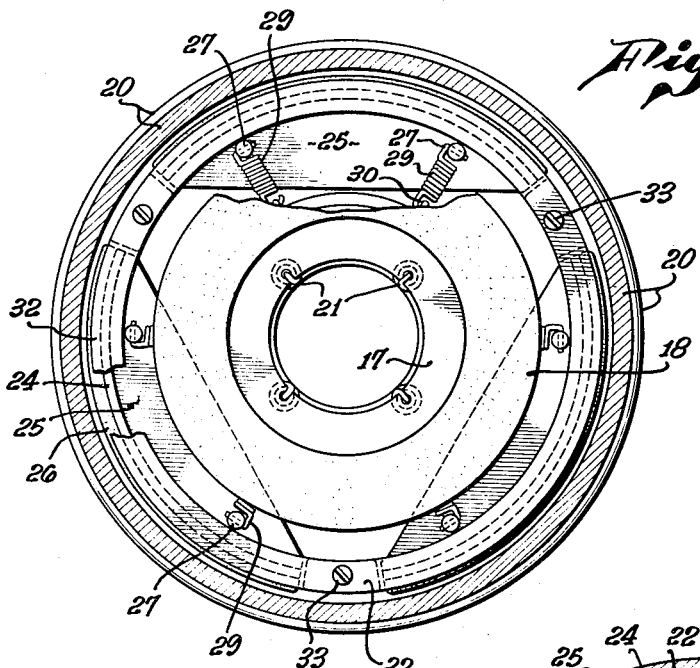
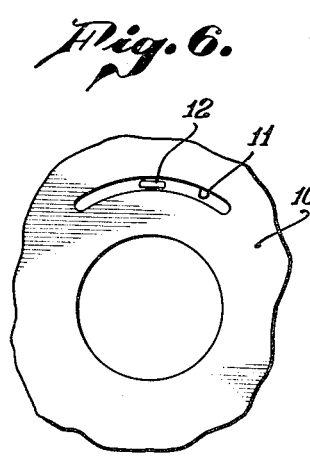
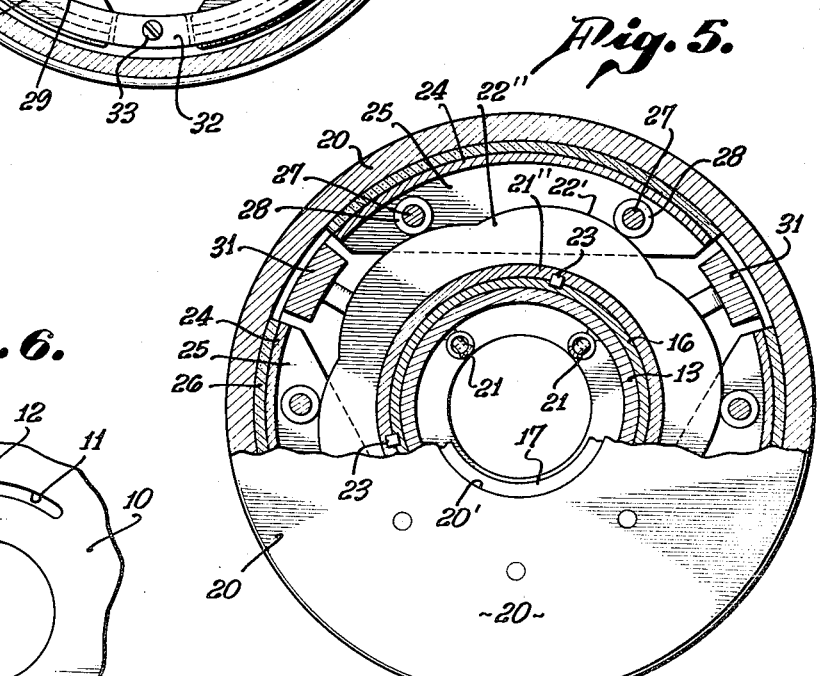
INVENTOR.
HERMAN E. JURGENS
ATTORNEY.

Patented July 8, 1952

2,602,525

UNITED STATES PATENT OFFICE 2,602,525

BRAKE MECHANISM FOR MOTOR-OPERATED VEHICLES

Herman Erich Jurgens, Compton, Calif.

Application July 2, 1949, Serial No. 102,736

8 Claims. (Cl. 188—140)

This invention relates to brake mechanisms for motor-operated vehicles, and it has among its salient objects:

To provide a brake mechanism in which the initial movement of one member moves a second member into frictional driving engagement with a drum on the wheel to be held, and which second member operates a main brake-shoe applying cam for moving said brake shoes into holding engagement with the same drum;

To provide in such a brake mechanism an annular cam member, rotatable about its axis for moving a second member axially into frictional driving engagement with a part turning with the wheel to be held, for operating a main cam for applying brake shoes to a brake drum by said turning wheel;

To provide in a brake mechanism of the character referred to, means whereby a plurality of brake shoes are expanded equally and evenly to a brake drum, to avoid possible distortion or breaking of the brake drum;

To provide in such a brake mechanism means whereby the main brake applying cam for moving the brake shoes into braking engagement with the brake drum on the wheel to be held is operated by the power of the wheel in motion, thus making the brake effort always in direct ratio to the braking force needed.

To provide in such a brake mechanism, means whereby a minimum of outside force is required to apply the brakes, because the application force is derived from the turning wheel to be held;

Many other advantages and features of operation will be apparent from the following more detailed description of one practical embodiment of my invention, taken with the accompanying two sheets of drawings illustrating the same, and on which:

Figure 4 is a sectional view taken on the line 4—4 of Fig. 1;

Figure 5 is an outer side view, with parts broken away and in section; and

Figure 6 is a fragmentary inner side view showing an operating member through a slot in the inner plate.

Figure 1:
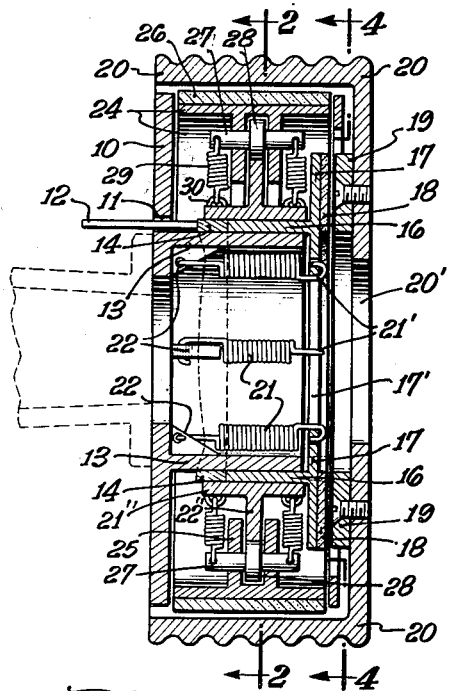
Figure 1 is a vertical cross sectional view through a brake mechanism embodying the invention, taken on the line 1—1 of Fig. 2.

Referring in detail to the drawings, an inner plate 10 is shown with a concentric slot 11 therethrough, and through which an operating arm or member 12 is shown in Figs. 1 and 6.

Figure 3:
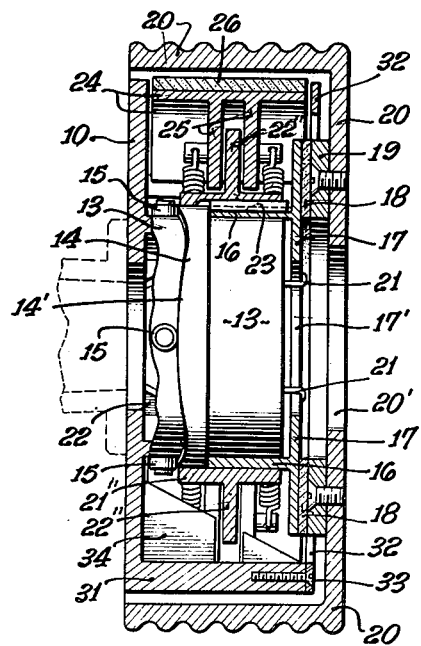
Figure 3 is a vertical cross sectional view thereof taken on line 3—3 of Fig. 2.
Figure 2:
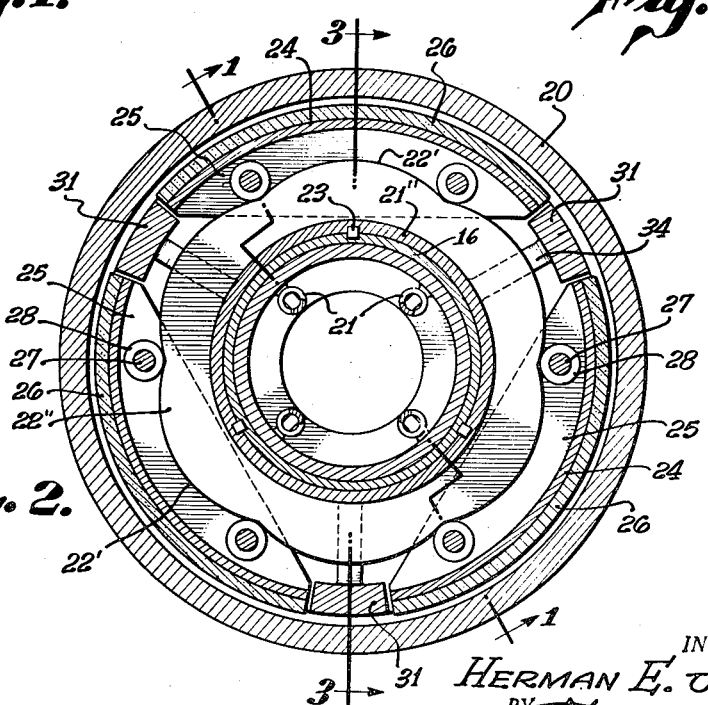
Figure 2 is a sectional view through said mechanism on line 2—2 of Fig. 1.

Formed on said plate is a concentric bearing drum 13, shown in section in Figs. 1 and 2 and 5. Rotatable on said bearing drum 13 is an annular cam ring 14, to which said operating arm 12 is connected, and by which said cam ring 14 can be turned in either direction to function. Said cam ring 14, as here shown, has four convexed cam surfaces, as 14', 14', around its edge, which bear on rollers, as 15, 15, mounted on said drum 13, as seen in Fig. 3, whereby when said cam ring is turned in either direction, by means of said arm, or otherwise, it is caused to move outwardly on said drum 13. Also mounted on said drum 13, with its edge bearing against the outer smooth edge of said cam ring 14, is a cylindrical member 16, provided on its outer edge with an annular disc-like member or portion 17, open in its center, as at 17', and having on its outer face a friction bearing ring 18, of suitable composition, adapted to be moved into frictional engagement with the annular friction member 19, secured on the inner face of a brake drum 20, as clearly shown in Fig. 3. Said brake drum 20, as shown, is of cup-like form and encloses all of the mechanism, with its inner edge flush with the inner plate 10, as seen in Figs. 1 and 3. Said drum is open in its center, as at 20'.

A plurality of coiled springs, as 21, 21, are connected at one end with the disc or face 17, at the edge of its open center, and at their other ends said springs are connected with fixed web parts, as at 22. These springs yieldingly hold the cylindrical member 16 and its outer disc-like face inwardly against the edge of the cam ring 14, as will be understood from Fig. 1.

The turning of the cam ring 14, by the arm or member 12, in either direction, operates to move the parts 16, 17 and 18 outwardly to put the friction ring 18 into frictional driving engagement with the annular member 19, on the inner face of the brake drum 20, whereby, when said drum 20 is revolved with the wheel (not shown) on which it would be mounted, said member 16, and its face 17 would be turned therewith.

Mounted on said cylindrical member 16 is a main cam ring or collar 21", having a cam web 22" thereon, around its outer face and at right angles thereto, said cam web having a series of cam surfaces or lobes designated 22', 22', and seen clearly in Figs. 2 and 5.

Said cam ring or collar 21" is keyed to the cylindrical member 16, on which it is mounted, as by keys 23, 23, as seen in Figs. 3, 2 and 5.

This key connection is such that the cylindrical member 16 and its friction face 17—18 can be moved outwardly by the turning of the cam ring 14, whereby to frictionally lock said members 16, 17 and 18 with the drum 20 for turning said members. Inasmuch as the main cam ring 21'' and its cam web 22'' are keyed to said member 16, said main cam ring 21'' will be turned therewith, as said drum 20 is turned with the wheel on which it would be mounted.

Mounted over said main cam ring, I have shown a plurality of brake shoes, designated 24, each having spaced web portions, as 25, on its inner face, adapted to straddle the cam web 22'', in the manner indicated in Figs. 1 and 3, each of said brake shoes being provided on its outer face with the usual brake lining 26.

Each of said brake shoes is provided with two through pins, as 27, in its web portions 25, 25, as seen in Figs. 1 and 3. Coiled springs 29, 29 are connected with the outer ends of said pins and at their other ends said springs are connected with suitable eyes, as 30, on the cam ring or member 21''. A cam bearing roller 28 is shown on each of said through pins 27, between the web portions 25, 25 of each brake shoe, to bear on the cam surfaces or lobes 21', 21', as seen in Figs. 1 and 2.

Between the adjacent ends of the brake shoes 24, 24, are spacing and anchor members, designated 31, 31, at equal intervals on the inner face member or plate 10, as indicated on Fig. 3, taken on the line 3—3 of Fig. 2, said members being connected at their outer edges by means of a ring member 32, secured thereto by means of screws 33. Formed in the angle between the face plate 10 and said spacing or abutment members 31, is an angle web portion, as 34, seen in Figs. 2 and 3. This forms a strong and rigid inner face plate 10 with its cylindrical bearing member 13, for supporting the cylindrical member 16 and the main brake-operating cam member 21''—22'' as well as the main or primary brake shoes, before described.

Thus I have provided an improved brake mechanism for use on motor-driven vehicles which is more efficient in performing the braking function, and one in which the turning of the wheel which is to be held operates to apply the brake shoes to the brake drum being turned by the same wheel, thus increasing the power applied by the kinetic power derived from the wheel being held. I accomplish this by providing a fixed supporting bearing member, which would be the parts 10 and 13 on the axle, indicated in light broken lines in Fig. 1. On this bearing member is an operating member, which is designated 14, having means for turning it in either direction on said bearing member. Said operating member has the cam faces around its edge to engage with the fixed roller elements, as 15, on said bearing member, whereby, as said operating member is turned in either direction, it is moved axially on said bearing member. The cylindrical member 16 can be referred to as an intermediate member, bearing against said operating member and movable axially by said operating member. Said intermediate member has friction engaging means, before referred to as 18, to be moved into engagement with the friction member 19 in the brake drum 20, all as clearly shown in Figs. 1 and 3. The main cam for operating the brake shoes is mounted on said intermediate member 16, and is slidably interlocked therewith by a key 23, whereby said main cam member is turned with said intermediate member and yet is slidable thereon into frictional driving engagement with the inner vertical face of the brake drum, as indicated at 17, 18 and 19, to be operated thereby. By this mechanism the frictional drive of the cam member with the intermediate member, operates to apply the brake shoes outwardly into frictional holding engagement with the main or conventional brake drum surface of the same brake drum. This mechanism and its means of operation is believed to be new. The parts are all connected as described in the specification, with the necessary springs for yieldingly holding and returning them to their normal or off positions. The operating member can be turned in either direction with the same action of moving the intermediate member axially into the brake drum, and no matter which way the wheel and drum are turning, the turning of the main cam member operates to apply the brake shoes most effectively to the brake drum. Another important feature is that the force required to move the operating member is very nominal, for it moves the intermediate member, which becomes an operating member, into operative engagement with the turning drum on the wheel to be held. Thus the ratio of applied power to the brake shoes is regulated by the frictional drive engagement of said intermediate member with said drum. The main cam member is such that the brake shoes are all equally and evenly applied, thus avoiding any distortion of the brake drum. It will be understood, of course, that the means or method of moving the operating member 14, can be any of the preferred means, such as mechanical, electrical or otherwise, as may be best suited for the job to be done.

I do not limit my invention to the details of construction and arrangement shown for explanatory purposes, for many changes can be made within the scope of the invention, and I do not limit the invention except as I may be limited by the hereto appended claims.

I claim:

1. In a brake mechanism, the combination with a brake drum for holding a wheel, a supporting bearing member extended into said drum, an operating member thereon with means for rotating it in either direction, an intermediate member on said bearing member and movable axially thereon by the rotating of said operating member, a plurality of brake shoes in said brake drum, each supported to be uniformly moved outwardly at both ends into braking engagement with said brake drum, an operating cam member for said shoes, operatively connected with and operated by said intermediate member, and operatively engaging each brake shoe in two places, said intermediate member having friction means thereon to engage and be turned by said brake drum, as said intermediate member is moved by said operating member.

2. In a brake mechanism for motor-driven vehicles, the combination with a brake drum on a wheel and the axle of said vehicle, of a fixed supporting bearing drum carried by the axle and extended into said brake drum, an operating member rotatable on said bearing drum with means for turning it, an intermediate member on said bearing member and movable axially thereon by said operating member, said intermediate member being movable axially into frictional driving engagement with said brake drum to be turned therewith, a plurality of brake shoes in said brake drum and movable uniformly outwardly at both ends into holding engagement therewith, and a brake shoe operating cam on said intermediate member to be turned therewith and having a series of cam lobes in engagement with each of said brake shoes toward both ends thereof for moving them uniformly outwardly into engagement with said brake drum for holding the same.

3. In a brake mechanism for motor-driven vehicles, the combination with a brake drum on a wheel and the axle of said wheel, of a fixed supporting bearing member carried on the axle and extended into said brake drum, an operating cam ring rotatable on said bearing member and having cam lobes on one edge with fixed cam engaging elements on said bearing member for moving said operating cam ring axially when it is rotated, means for turning said operating cam ring, an intermediate member on said bearing member movable axially by said operating cam ring as the latter is turned on said bearing member, said intermediate member having a friction element within said brake drum and movable against the brake drum, to be turned therewith, by said operating cam ring member, a plurality of brake shoes within said brake drum and movable uniformly outwardly for its full length, into holding engagement with the inside of said drum, a main cam member on said intermediate member and having a series of cam lobes operable on both ends of each of said brake shoes, when turned, to force said brake shoes uniformly into holding engagement throughout their entire lengths with said drum, said main cam member being interlocked with said intermediate member to turn therewith and slidable thereon into frictional engagement with the inner face of said drum to be turned thereby, for moving said brake shoes.

4. The combination with a vehicle axle and carrier wheels thereon, of a brake mechanism therefor, including in combination: an inner plate with bearing drum thereon carried by said axle at its wheel end, a cam ring on said drum with means for turning it in either direction, an intermediate member on said drum and movable axially by said cam ring when the latter is turned, said intermediate member having a friction member on its outer end, a brake drum on the wheel on said axle, said friction member being movable into frictional driving engagement with the inside of said brake drum by the turning of said cam ring, a plurality of brake shoes in said brake drum, and movable outwardly into holding engagement with said brake drum, and a rotatable cam member on said intermediate member and having cam lobes operating on said brake shoes to move them uniformly outwardly into holding engagement throughout their lengths with said brake drum, said cam member being connected with said intermediate member and its friction member, whereby as said intermediate member is turned by said friction member from said brake drum, said cam member is rotated to apply said brake shoes.

5. The combination with a wheel, its axle and brake drum, of a brake mechanism including a plurality of brake shoes in said brake drum, each of said brake shoes having two spaced web portions on its inner side with cam rollers therebetween near both ends, said brake shoes being movable bodily and uniformly outwardly at both ends into braking engagement with said brake drum, a cam ring carried by said axle within said drum and rotatable relative thereto, said cam ring having a series of cam lobes thereon to engage said cam rollers for moving said brake shoes outwardly, said cam ring and its cam lobes being operable in both directions to operatively move said brake shoes, and means for interlocking said cam ring with said brake drum at will, whereby said brake drum turns said cam ring and operates said brake shoes.

6. The combination with a wheel, its axle and brake drum, of a brake mechanism including a plurality of brake shoes in said brake drum, each of said brake shoes having two spaced web portions lengthwise thereof on its inner side, with two cam rollers therebetween, one at each end, a supporting member carried by said axle within said brake drum, a cam ring around said supporting member, said cam having a web portion at right angles thereto, said web portion having a series of cam lobes thereon to engage said cam rollers for moving said brake shoes outwardly, said cam ring and lobes being operable in either direction to operate said brake shoes, and means manually operable for interlocking said cam ring with said brake drum, whereby the turning of said brake drum turns said cam ring and moves said brake shoes.

7. A claim as set forth in claim 6, in which spacing and anchor members are interposed between the adjacent ends of said brake shoes.

8. In combination with a wheel, its axle and brake drum; a brake mechanism including a plurality of brake shoes in said brake drum, each having two spaced cam rollers on its inner side, said brake shoes being movable uniformly radially outwardly at both ends into braking engagement with said brake drum, a cam ring carried by said axle within said brake drum and rotatable relative thereto, said cam ring having a series of cam lobes in position to engage with said cam rollers on said brake shoes to simultaneously and uniformly move them into braking engagement with said brake drum, spacing and anchor members interposed between the adjacent ends of said brake shoes, said anchor members being rigidly connected together as a unit, and means for rotating said cam ring to apply said brake shoes.

HERMAN ERICH JURGENS.

REFERENCES CITED

The following references are of record in the file of this patent:

UNITED STATES PATENTS

| Number | Name | Date |
|---|---|---|
| 1,603,963 | Liebowitz | Oct. 19, 1926 |
| 1,946,928 | Brewer | Feb. 13, 1934 |
| 1,957,668 | Renaux | May 8, 1934 |